(12) United States Patent
Spiers

(10) Patent No.: US 8,087,158 B2
(45) Date of Patent: Jan. 3, 2012

(54) METHOD OF MANUFACTURING A LAMINATED ARMATURE FOR A FUEL INJECTOR

(75) Inventor: Dean Leigh Spiers, Yorktown, VA (US)

(73) Assignee: Continental Automotive Systems US, Inc., Auburn Hills ( * ) Notice: Subject to any disclaimer, the term of this patent is extended or adjusted under 35 U.S.C. 154(b) by 527 days.

(21) Appl. No.: 12/289,579

(22) Filed: Oct. 30, 2008

(65) Prior Publication Data

US 2009/0115262 A1    May 7, 2009

Related U.S. Application Data

(60) Provisional application No. 60/983,762, filed on Oct. 30, 2007.

(51) Int. Cl.
*H01F 3/04* (2006.01)
*H01F 7/127* (2006.01)

(52) U.S. Cl. ............ 29/609; 29/607; 29/596; 29/598; 310/264; 310/267

(58) Field of Classification Search ............ 29/596, 29/598, 33 L, 607, 608, 609; 310/254.1, 310/261.1, 264, 267
See application file for complete search history.

(56) References Cited

U.S. PATENT DOCUMENTS 4,110,895 A * 9/1978 Mitsui .................. 29/598 X
4,217,168 A * 8/1980 Ridgway et al. ........... 29/609 X

FOREIGN PATENT DOCUMENTS

JP            06189509 A * 7/1994 ............. 29/609

* cited by examiner

*Primary Examiner* — A. Dexter Tugbang

(57) ABSTRACT

A method of producing a laminated armature for a fuel injector provides providing a plurality of laminations (10) in plate-shaped strip stock material (12). Each lamination has a base (11) and a plurality of tabs (20, 22) extending from the base. The base and tabs are coplanar. The laminations are cut from the strip material, with the tabs having free ends (25). The tabs are bent so as to be generally transverse with respect to the base. The laminations are then stacked on top of each other and joined together. The free ends of the tabs are cut to define a generally planar impact surface.

7 Claims, 3 Drawing Sheets

METHOD OF MANUFACTURING A LAMINATED ARMATURE FOR A FUEL INJECTOR

This application claims the benefit of the earlier filing date of U.S. Provisional Application No. 60/983,762, filed on Oct. 30, 2007, which is incorporated by reference herein in its entirety.

FIELD OF THE INVENTION

This invention relates to armatures of an automotive fuel injector and, more particularly, to a method of making a laminated armature from strip stock.

BACKGROUND OF THE INVENTION

Conventional armatures for fuel injectors are typically non-laminated or made from a solid piece of material. These conventional armatures add to the overall cost of the fuel injector. Although the conventional armatures are suitable for their intended purpose, there is a need to provide an armature that reduces the overall fuel injector cost and that provides an increased flux.

SUMMARY OF THE INVENTION

An object of an embodiment is to fulfill the need referred to above. In accordance with the principles of the present invention, this objective is achieved by a method of providing a laminated armature. The method provides a plurality of laminations in plate-shaped strip stock material. Each lamination has a base and a plurality of tabs extending from the base. The base and tabs are coplanar. The laminations are cut from the strip material, with the tabs having free ends. The tabs are bent so as to be generally transverse with respect to the base. The laminations are then stacked on top of each other and joined together. The free ends of the tabs are cut to define a generally planar impact surface.

In accordance with another aspect of an embodiment, a laminated armature for a fuel injector includes a plurality of laminations stacked on top of each other and joined. Each lamination includes a base having a central opening therethrough so as to define a common opening through the laminated armature. Each lamination includes a plurality of tabs extending generally transversely from the base. Free ends of the tabs defining a generally planar impact surface of the laminated armature.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
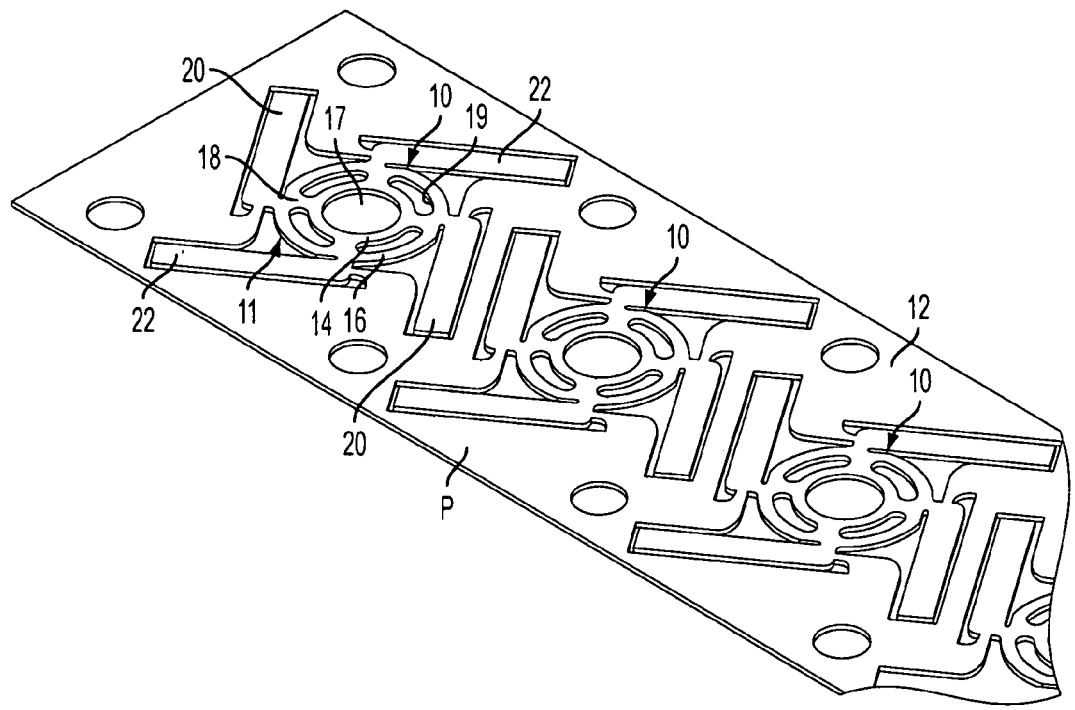
FIG. 1 shows a plurality of laminations stamped or photo etched in strip stock in accordance with an embodiment.

A method of forming a laminated armature for a fuel injector for an automobile is described with reference to FIGS. 1-5. As shown in FIG. 1, a plurality of laminations, generally indicated at 10, are stamped or photo etched in plate-shaped strip stock material 12. The strip stock 12 is of ferromagnetic material suitable for an armature of a solenoid type valve or the like. Each armature includes a base, generally indicated at 11, including a central ring member 12 joined with a concentric outer ring member 16 via a plurality of bridges 18. The central ring member 12 has an opening 17 there-through, the function of which will be explained below. Openings 19 are provided between the bridges 18 for fuel to pass therethrough when used in a fuel injector (not shown). A plurality of tabs extend from the base. More particularly, in the embodiment, a first pair of tabs 20 extend in opposing directions from the periphery of the outer ring member 16 and a second pair of tabs 22 extend in opposing directions, also from the periphery of the central ring member 16. Thus, the tabs and base 11 all on the same plane P.

Figure 2:
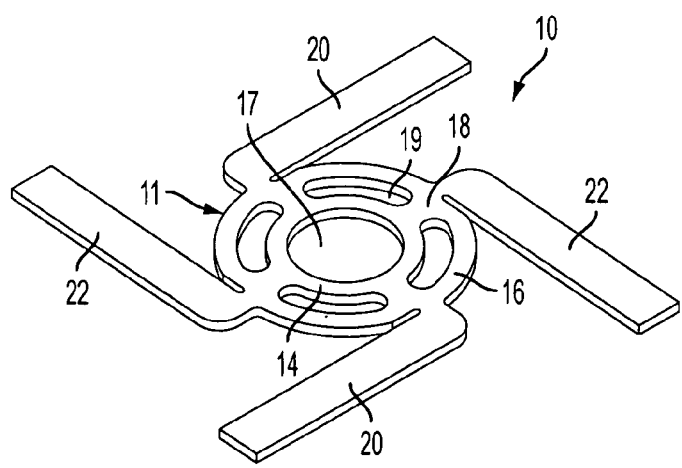
FIG. 2 shows a single lamination cut from the strip stock of FIG. 1.
Figure 3:
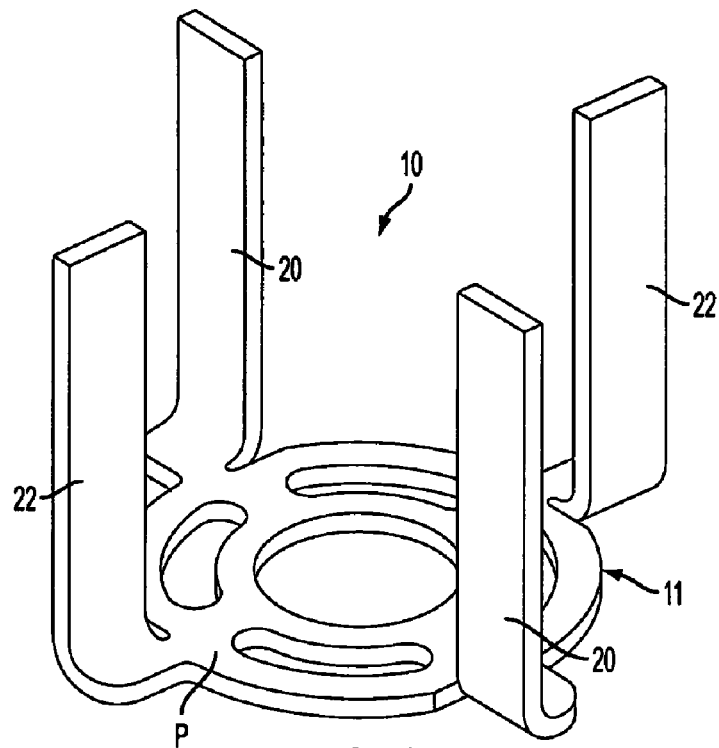
FIG. 3 shows tabs of the lamination of FIG. 2 folded 90°.
Figure 4:
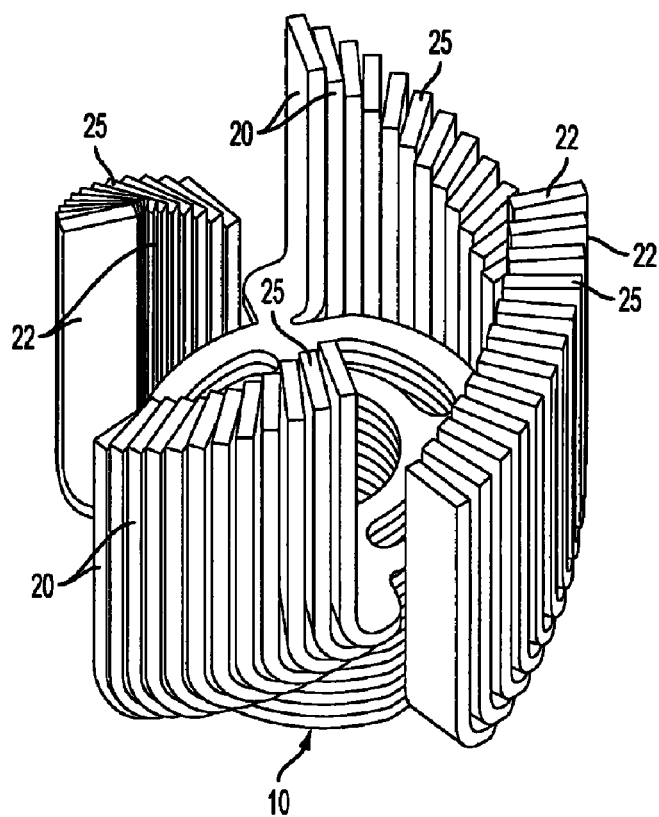
FIG. 4 shows a plurality of laminations of FIG. 3 stacked and welded together.
Figure 5:
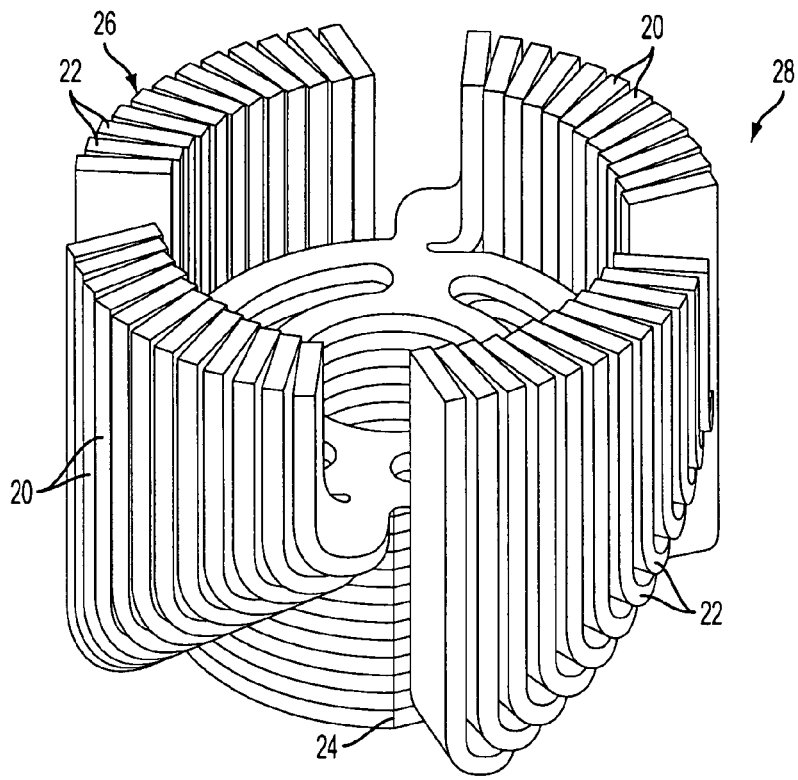
FIG. 5 shows the lamination stack of FIG. 4 defining a laminated armature after machining to create an impact face.

With reference to FIG. 2, each lamination 10 is cut from the strip 12. Thereafter, as shown in FIG. 3, the tabs 20, 22 are folded or bent to be substantially transverse (e.g., 90°) with respect to the plane P of the base 11. As shown in FIG. 4, a plurality of laminations are then stacked on top of each other and are joined together, preferably via a weld 24. Finally as shown in FIG. 5, the free ends 25 of the tabs 20, 22 of the stacked structure of FIG. 4 are machined to create a generally planar impact face, generally indicated at 26, thereby defining a laminated armature 28.

Figure 6:
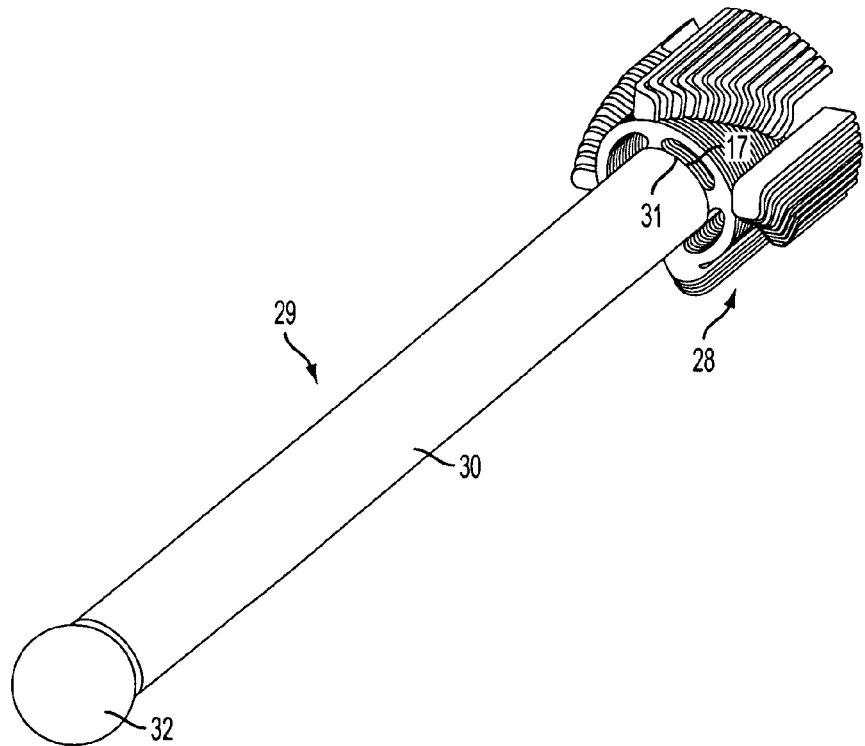
FIG. 6 shows the laminated armature of FIG. 5 as part of a ball tube assembly of a fuel injector.

With reference to FIG. 6, the laminated armature 28 can be coupled with a ball tube assembly, generally indicated at 29, of a fuel injector of the type disclosed in U.S. Pat. No. 7,347,383, the contents of which is hereby incorporated by reference into this specification. In particular, the ball tube assembly 29 includes a tube 30 having an end received in the openings 17 (defining common opening 31) of the laminated armature 28. A ball 32 is associated with the other end of the tube 30 to define a closure member of a fuel injector in the conventional manner.

The laminated armature 28 reduces the overall cost of a fuel injector and to provide increased flux as compared to non-laminated fuel injector armatures.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of providing a laminated armature comprising sequential steps of:

providing a plurality of laminations in plate-shaped strip stock material, each lamination having a base and a plurality of tabs extending from the base, the base and tabs being coplanar, cutting the laminations from the strip stock material, with the tabs having free ends, bending the tabs so as to be generally transverse with respect to the base, stacking the laminations on top of each other, joining the stacked laminations together, and cutting the free ends of the tabs to define a generally planar impact surface.

2. The method of claim 1, wherein the step of providing the plurality of laminations includes stamping the laminations into the strip stock material.

3. The method of claim 1, wherein the step of providing the plurality of laminations includes etching the laminations in the strip stock material.

4. The method of claim 1, wherein the step of joining the laminations includes welding the laminations.

5. The method of claim 1, wherein the step of cutting the free ends of the tabs includes machining the free ends of the tabs.

6. The method of claim 1, wherein the step of providing the plurality of laminations includes providing each base to include a central ring member joined with a concentric outer ring member via a plurality of bridges, with openings provided between the bridges and with the tabs coupled to a periphery of the outer ring member.

7. The method of claim 6, wherein each central ring member has an opening there-through such that when the laminations are stacked, a common opening formed from the openings there-through is defined, the method further including providing a ball tube assembly of a fuel injector, the ball tube assembly having a tube with first and second ends, a ball being associated with the first end and the second end being received in the common opening.

* * * * *